Nov. 9, 1926. C. N. ALTER ET AL Re. 16,464

ELECTRIC BRAKE

Original Filed April 3, 1925

INVENTOR

C. N. Alter

Ernest Smith

By Symes, Abbott, Comstock

Their Attys

Reissued Nov. 9, 1926.

Re. 16,464

UNITED STATES PATENT OFFICE.

CHARLES N. ALTER AND ERNEST SMITH, OF ALLIANCE, OHIO.

ELECTRIC BRAKE.

Original No. 1,591,692, dated July 6, 1926, Serial No. 20,357, filed April 3, 1925. Application for reissue filed August 11, 1926. Serial No. 128,716.

The present invention relates to brakes, and more particularly to electrically operated brakes such as are employed on bridge hoists and similar apparatus.

The object of the invention is to provide an efficient brake of this type which is normally spring-applied and adapted to be moved to released position by a relatively small amount of applied power.

The invention is illustrated in the accompanying drawings, wherein—

Figure 1:
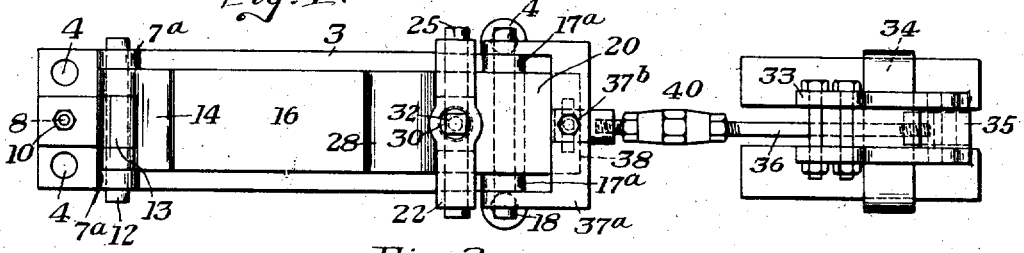
Figure 2:
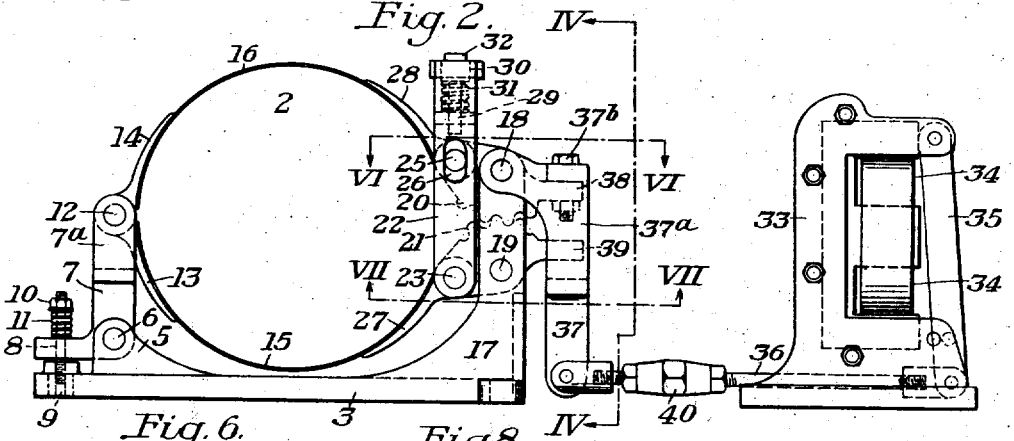
Figure 6:
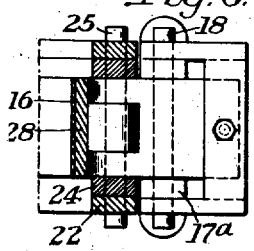
Figure 8:
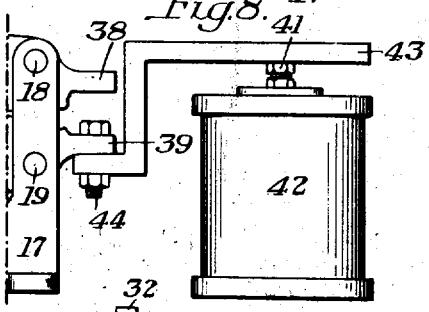
Figure 5:
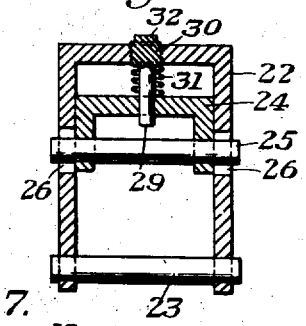
Figure 3:
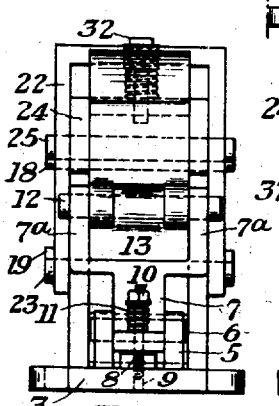
Figure 4:
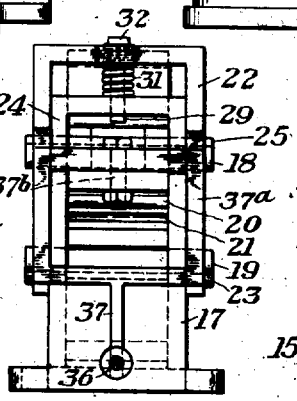
Figure 7:
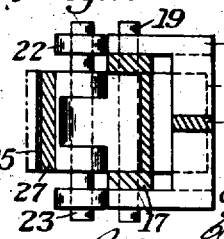

Figs. 1 and 2 are respectively a plan view and a side elevation of a brake embodying a preferred form of our invention; Fig. 3 is an end elevation of the brake looking from the left; Fig. 4 is a section on the line IV—IV of Fig. 2; Fig. 5 is a detail sectional view of certain of the parts of the brake assembly; Figs. 6 and 7 are respectively detail sectional views on the lines VI—VI and VII—VII of Fig. 2; and Fig. 8 is a detail view showing a slight modification.

Referring to Figs. 1 to 7, inclusive, 2 designates a brake drum. Beneath the drum is a base casting 3 having holes 4 at its opposite ends whereby it is adapted to be secured to a suitable support by bolts or screws.

The base 3 has ears 5 adjacent its rear end through which extends a pin 6 upon which is journaled a bell-crank lever 7. The shorter horizontal arm of the bell-crank lever 7 has a screw-threaded pin 8 extending through an opening therein. This pin is threaded into an opening 9 in the base 3 and has a nut 10 mounted on its upper end. A spring 11 surrounds the pin 8 between the nut 10 and the upper surface of the horizontal arm of the bell-crank lever. The vertical arm of the bell-crank lever has a forked upper extremity and a pivot pin 12 extends through the branches 7[a] thereof. Journaled upon the pin 12 are clips 13 and 14 secured to the ends of brake band elements 15 and 16.

The base 3 has an integral vertical arm 17 at its forward end. This arm has a bifurcated or forked upper extremity and through the branches 17[a] thereof extend upper and lower pivot pins 18 and 19 upon which are journaled intermeshing gear segments 20 and 21. An inverted U-shaped member 22 is journaled at its lower end upon a pin 23 which extends through an opening in the gear segment 21. Sliding between the vertical arms of the U-shaped member 22 is another inverted U-shaped member 24, the vertical arms of which are journaled upon a pin 25 extending through an opening in the bifurcated end of the gear segment 20. This pin extends through slots 26 in the arms of the U-shaped member 22. Journaled upon the pins 23 and 25 are clips 27 and 28 attached to the ends of the brake band elements 15 and 16. A pin 29 extends through an opening in the head of the U-shaped member 24 and has a screw-threaded head 30 which is screwed into the head of the U-shaped member 22. This pin is surrounded by a coil spring 31, the ends of which bear against the upper surface of the head of the U-shaped member 24 and the under surface of the head of the U-shaped member 22. The pin 29 has a wrench engaging portion 32 above its screw-threaded head whereby the pin can be screwed in or out of the head of the U-shaped member 22 to increase or decrease the tension of the spring 31.

It will be apparent that the spring 31 exerts its tension to tend to move the pivot pins 23 and 25 towards each other and thereby maintain the brake normally applied. The bell-crank lever 7 affords a yielding pivotal support for each of the brake band elements and tends to equalize the applied pressure.

In Figs. 1 and 2 we have shown one form of electrical means for releasing the brake. Referring to these figures, 33 represents a solenoid housing having a coil 34 therein and an armature 35 pivoted at its upper end. The lower end of the armature is connected by a link 36 to the lower end of a bell-crank operating member 37. The horizontal arm of this bell-crank lever is bifurcated and the branches thereof pivoted upon the ends of the pin 18. The vertical arm of the bell-crank lever has a yoke portion 37[a] into the opening in which extend the ends 38 and 39 of the gear segments 20 and 21. The end 38 is bolted to the under surface of the head of the yoke portion 37[a] by a bolt 37[b]. The link 36 is adjustable in length by means of a turn-buckle 40. It will be apparent that when the coil 34 is energized and the armature 35 attracted, the gear segments 20 and 21 will be rotated on their pivots 18 and 19 in a direction to move the pins 23 and 25 away from each other and thus release the brake.

In Fig. 8 we have shown a slightly modified form of electrical brake releasing means. In this modification the plunger 41 of a solenoid 42 bears against the under surface of an operating arm 43. This arm is bolted to the end 39 of the gear segment 21 by means of a bolt 44. It will be seen that when the solenoid coil is energized to cause the plunger 41 to move upwardly, the gear segments 20 and 21 will be rotated in a direction to release the brake.

While we have shown and described certain preferred embodiments of our invention, it will be understood that the invention is not limited to its illustrated embodiments, but that it may be otherwise embodied within the scope of the appended claims without departing from the spirit of the invention.

We claim:

1. A brake, comprising a brake band, a pair of pivoted intermeshing gear segments connected to the ends of said brake band, a spring means operatively connecting the said gear segments and tending to rotate them in one direction, and means operatively connected to one of said segments for rotating them in the opposite direction.

2. A brake, comprising a brake band, a pair of pivoted intermeshing gear segments connected to the ends of said brake band, spring means operatively connecting the said gear segments and tending to rotate them in a direction to apply the brake, and means operatively connected to one of said segments for rotating them in a direction to release the brake.

3. A brake, comprising a brake band, a pair of pivoted intermeshing gear segments connected to the ends of said brake band, spring means operatively connecting the two said gear segments and tending to rotate them in a direction to apply the brake, and electrical means operatively connected to one of said segments for rotating them in a direction to release the brake.

4. A brake, comprising a brake band, a base, a bell-crank lever pivoted to said base and having one arm thereof pivotally connected to said brake band, a spring acting on the other arm of said lever and tending to swing the first arm in a direction to apply tension to the brake band, a pair of intermeshing gear segments pivoted to said base and pivotally connected to the ends of said brake band, spring means operatively connected to said gear segments and tending to rotate them in a direction to apply the brake, and means operatively connected to one of said gear segments for rotating said segments in the opposite direction to release the brake.

5. The combination with a brake drum, of a brake comprising a pair of brake band elements surrounding said drum, a base, a bell-crank lever pivoted to said base adjacent one end of the latter and having one arm thereof pivoted to one end of each of said brake band elements, a spring acting on the other arm of said lever and tending to swing the first arm away from said drum, a bifurcated arm integral with the other end of said base and having a pair of intermeshing gear segments pivoted thereon, said segments being pivoted to the other ends of said brake band elements, an inverted U-shaped member pivoted at its lower end to one of said gear segments, an inverted U-shaped member sliding in the first U-shaped member and connected to the other gear segment, a spring acting on both of said U-shaped members and tending to move them in a direction to apply the brake, and means operatively connected to one of said gear segments for rotating them in a direction to release the brake.

6. In brake mechanism, the combination of a two element brake band having said elements pivotally connected together at one end, a pivotal resilient support for said pivoted ends of said brake elements, and means for actuating the free ends of said elements in both braking and releasing directions.

7. In brake mechanism, the combination of a brake drum, a two element brake band for said drum, said brake elements being pivotally mounted together at one end, actuating mechanism connected to the other ends of said elements for moving them into and out of engagement with said drum, and a pivotal support for the pivotally connected ends of said elements and resilient means normally tending to move said pivotal support away from said drum.

8. In brake mechanism, the combination of a brake drum, a two element brake band for said drum, said brake elements being pivotally mounted together at one end, actuating mechanism connected to the other ends of said elements for moving them into and out of engagement with said drum, a pivotal support for the pivotally connected ends of said elements and resilient means normally tending to move said pivotal support away from said drum, and means for limiting the movement of said pivotal support to a predetermined distance.

9. In brake mechanism, the combination of a brake drum, a two element brake band for said drum, said brake elements being pivotally mounted together at one end, actuating mechanism connected to the other ends of said elements for moving them into and out of engagement with said drum, a pivotal support for the pivotally connected ends of said elements and resilient means normally tending to move said pivotal support away from said drum, and means for adjusting the resilient means to vary the tension thereof.

10. In brake mechanism, the combination of a brake drum, a two element brake band for said drum, said brake elements being pivotally mounted together at one end, actuating mechanism connected to the other ends of said elements for moving them into and out of engagement with said drum, a pivotal support for the pivotally connected ends of said elements and resilient means normally tending to move said pivotal support away from said drum, means for limiting the movement of said pivotal support to a predetermined distance, and means for adjusting the resilient means to vary the tension thereof.

11. In brake mechanism, the combination of a brake drum, two semicircular brake band elements pivotally connected together, brake actuating mechanism attached to the free ends of said elements and adapted to move said elements in both brake applying and releasing directions, a pivotally mounted support for the pivotal connection of said elements, and resilient means connected to said support and normally adapted to move the same and said brake elements away from said drum.

12. In brake mechanism, the combination of a brake drum, two semicircular brake band elements pivotally connected together, brake actuating mechanism attached to the free ends of said elements and adapted to move said elements in both brake applying and releasing directions, a pivotally mounted support for the pivotal connection of said elements, and resilient means connected to said support and normally adapted to move the same and said brake elements away from said drum, the connection between said support and said elements being substantially diametrically opposite the free ends of said elements.

Signed by us this 9th day of Aug., 1926.

CHARLES N. ALTER.
ERNEST SMITH.